April 11, 1961
J. D. YANDA
2,979,074
POUCH SAFETY VALVE HEATER
Filed May 28, 1959
2 Sheets-Sheet 1
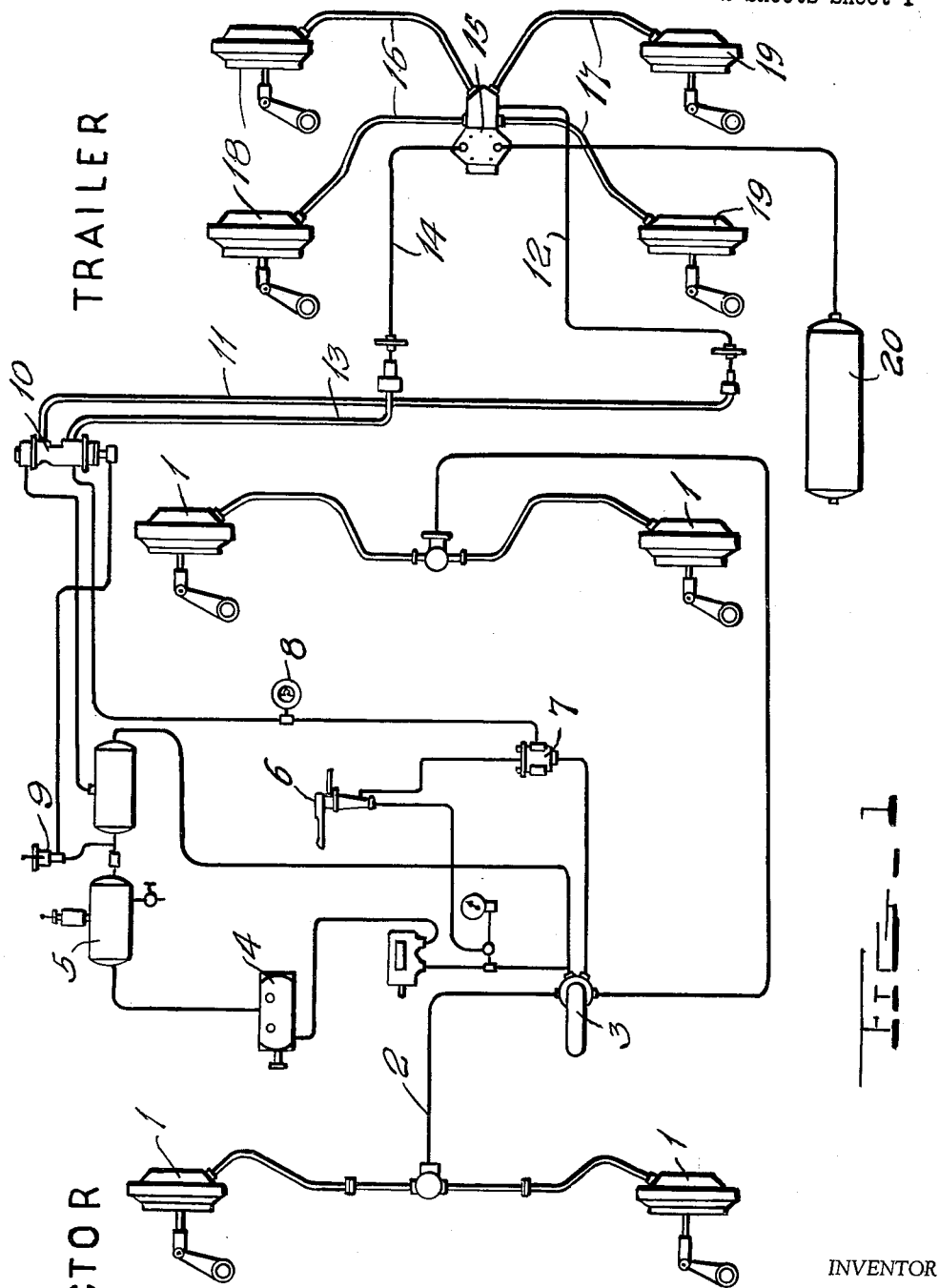
INVENTOR
JOHN D. YANDA,
BY Linton and Linton
ATTORNEYS April 11, 1961  J. D. YANDA  2,979,074
POUCH SAFETY VALVE HEATER
Filed May 28, 1959  2 Sheets-Sheet 2
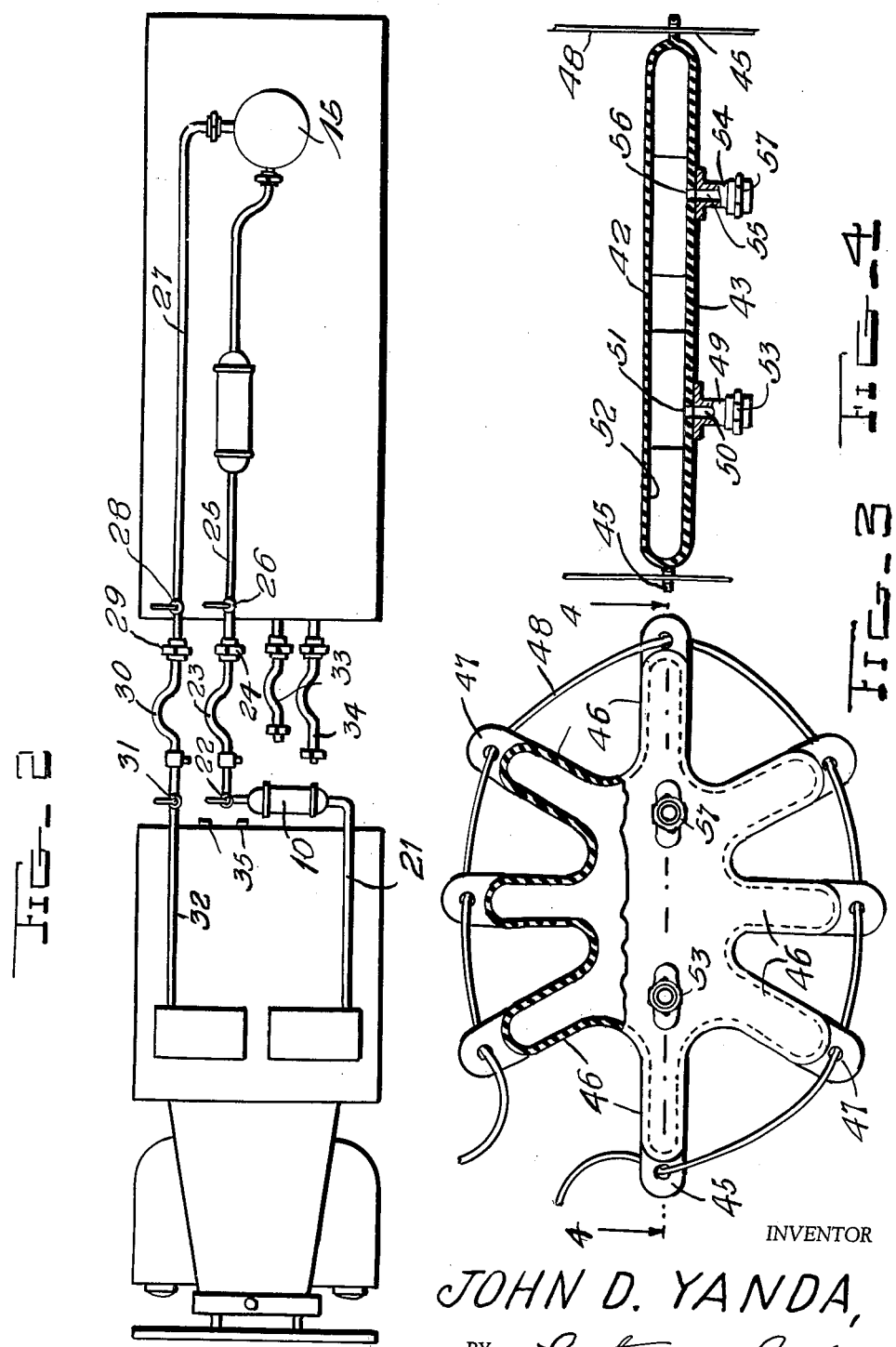
INVENTOR
JOHN D. YANDA,
BY Linton and Linton
ATTORNEYS

2,979,074
POUCH SAFETY VALVE HEATER

John D. Yanda, Maple Lane, Bethlehem, Wheeling, W. Va.

Filed May 28, 1959, Ser. No. 816,616

1 Claim. (Cl. 137—340)

The present invention relates to tractor-trailer brake systems and is more particularly directed to means for maintaining safety valves of such systems operative in freezing weather.

The principal object of the present invention is to provide means for preventing safety valves of tractor-trailer brake systems from becoming inoperative when exposed to low temperatures as in wintertime and thus not operating for their intended purpose.

A further and important object of the invention is to provide a system for heating the brake system safety valve of a truck alone or also the brake safety valve of a trailer attached to said truck.

Another and equally important object is to provide a heater pouch for attachment to existing brake system safety valves for providing heat to such valves when in operation during exposure to below freezing temperatures.

Further objects of the invention will be in part obvious and in part pointed out in the following detailed description of the accompanying drawings in which, Fig. 1 is a schematic view of a known tractor-trailer brake system as an example of such a system to which the present invention can be applied.

Fig. 2 is a schematic view of a tractor-trailer with one form of the present valve heating system applied thereto.

Fig. 3 is a top view partly in section of a heating pouch.

And Fig. 4 is a cross-sectional view taken on line 4—4 of Fig. 3.

Referring now more particularly to the accompanying drawings in which like and corresponding elements are designated by similar reference characters.

Fig. 1 discloses a conventional tractor-trailer air brake system to which the present invention is applied. Numerals 1 indicate the brake operating chambers of the tractor which are connected by a tube 2 to a brake valve 3. The air compressor 4 is connected to a reservoir 5 and the system has included therein a hand valve 6, double check valve 7, and a stop light switch 8. The system is operated by a control valve 9 except when the pressure in the reservoir 5 becomes abruptly reduced, whereupon a protection valve 10 automatically produces an emergency application of the trailer brake chambers 18 and 19 to which the protection valve 10 is connected by tubes 11—14 through a relay emergency valve 15 and tubes 16 and 17, respectively. Also connected to the relay emergency valve is a trailer reservoir 20.

The operation of the system under normal conditions, is by a driver operating the control valve 9, whereby air from the tractor reservoir 5 passes through said control valve to the tractor protection valve 10 which opens the lines 11 and 13 to the trailer brake system. In case of an emergency, the brakes can be applied on the trailer by the driver through the control valve 9 venting the protection valve 10 closing off the air flow in lines 11 and 13, whereby the relay emergency valve 15 applies the trailer brakes. However, should the reservoir pressure on the tractor become suddenly reduced without the driver's knowledge, the tractor protection valve 10 automatically causes an emergency valve 15 to function and apply the trailer brakes.

In actual present day application of such braking systems, to tractor-trailers, the tractor protection valve 10 is located exteriorly on the tractor behind the driver's cab for ready accessibility and service. This valve 10 is thus exposed to the atmosphere and in cold weather the valve sticks, freezes, and binds due to moisture freezing the moving parts thereof.

Also, the relay emergency valve 15 located on the trailer is designed so that if air loss should occur the relay emergency valve closes automatically and locks the trailer wheel brakes. In cold or freezing weather if the truck is caused to stand still, such as in heavy traffic with the trailer brakes on, these trailer brakes frequently remain locked in their applied position due to the cold weather freezing the valve parts making it impossible to move the vehicle. Also, if the vehicle is parked overnight with the trailer brakes applied, the brakes will remain in this on position due to the malfunctioning of the emergency valve 15. Due to the cold atmosphere surrounding the exposed valves 10 and 15 they do not always function as intended and can prevent the application of the brakes causing serious accidents.

To overcome the above objections to the conventional brake systems in cold weather, a tube 21 is connected to the pressure side of the liquid cooling system (not shown) of the tractor engine for receiving liquid heated by said engine from the cooling system and conveying this liquid to means such as 42 in contact with the protective valve 10. A valve 22 controls the flow of said liquid and is connected to a flexible detachable tube 23 which can be joined by a coupling 24 to a tube 25 carried by the trailer. The flow of liquid through the tube 25 is also controlled by valve 26, while said tube 25 is connected to a means such as 42 in contact with the relay emergency valve 15. The further flow of fluid from these means is carried by a tube 27 having a control valve 28 included therein and attached by a coupling 29 to a second flexible detachable tube 30. Said tube 30 is connected to a lead tube 32 with the liquid flow therebetween controlled by valve 31. Said tube 32 is connected to the cooling system of the vehicle engine for returning the fluid to the cooling system.

Tractor-trailers already in existence having the valves 10 and 15 as a part thereof may be heated without substituting new valves by the pouch shown in Figs. 3 and 4. This pouch consists of a sheet 42 superimposed upon a sheet 43 with both sheets being formed of a rubberized material vulcanized together at their edges forming a closed pouch. Said sheets 42 and 43 are of a configuration for providing a plurality of fingers 46 extending radially and having flanged ends 45 with each flanged end having an eyelet 47 through which extends a lacing 48. Sheet 43 has a tube 49 fastened thereto in any conventional manner which tube 49 has a bore 50 communicating with an opening 51 in sheet 43. A second tube 54 also is connected to sheet 43 with its bore 55 in communication with an opening 56 in said sheet 43. Tube 49 has a coupling 53 on its ends, while tube 54 has a similar coupling 57 on its end.

The present heating pouch can be applied to either the protection valve 10 or the emergency valve 15 by placing the sheet 42 against the valve and placing the fingers around the valve between the tubes connected thereto and thereupon pulling and tieing the lacing 48 fastening the pouch to the valve. There upon couplings 53 and 57 can be connected to tubes 21 and 23, for example, if applied to valve 10 or to tubes 25 and 27 if applied to valve 15, whereupon fluid from tube 21 or tube 25 will enter the interior 52 of the pouch and exhaust through the opposite opening either 51 or 56. In this manner the valve will be heated and these pouches can be applied to trucks already in use without modifying the valves thereon.

In accordance with the present system, when the tractor is joined to the trailer tubes 23 and 30 are joined by couplings 24 and 29 to tubes 25 and 27, respectively. Thereupon, valves 22, 26, 28 and 31 are manually opened. Upon the starting of the vehicle engine and as soon as the same becomes warmed to normal operating temperatures, fluid passes through tube 21 to the member 42 in contact with valve 10, thereby maintaining said valve in a warm condition assuring its proper functioning. The fluid from the member 42 in contact with valve 10 then passes through tube 23 or tube 25 to the member 42 in contact with valve 15, also heating this valve to assure its proper functioning. The fluid continues through tube 27 to tubes 30 and 32 back to the engine cooling system, whereupon it passes through said cooling system back to tube 21.

Should the tractor alone be employed, tube 23 can be connected to tube 30 eliminating the passage of fluid through the trailer system, or, in the summer time, tubes 23 and 30 can be connected to dead end tubes 34 and 33, respectively, or connected to stoppers 35 mounted on the vehicle cab, so that the fluid does not flow through the present heating system. It is to be appreciated that valves 22, 26, 28 and 31 are also closed during coupling or uncoupling of tubes 23 and 30 to further prevent the flow of fluid.

It is to be appreciated that the configuration of the Figs. 3 and 4 are to be in accordance with the particular configuration of the valve to which the pouch is to be applied and is not limited to the showing in Figs. 3 and 4.

The present invention is capable of considerable modification and such changes thereto as come within the scope of the appended claim are deemed to be a part of the present invention.

I claim:

A heating device for air brake system valves comprising a closed pouch having radial fingers for being fitted around said valve, said fingers having flanged ends with openings therethrough, flexible means extending through said openings for drawing said fingers about said valve and attaching the same thereon and said pouch having couplings for connecting the same to a source of heated liquid.

References Cited in the file of this patent

UNITED STATES PATENTS 1,495,419     Levison _____ May 27, 1924

FOREIGN PATENTS 226,139     Switzerland _____ June 16, 1943